United States Patent [19]
Rickert

[11] Patent Number: 4,651,219
[45] Date of Patent: Mar. 17, 1987

[54] DEPTH PERCEPTION BY IMAGE ISOLATION

[76] Inventor: Glenn E. Rickert, 3429 W. 700, North, Huntington, Ind. 46750

[21] Appl. No.: 729,533

[22] Filed: May 2, 1985

[51] Int. Cl.$^4$ ............................................... H04N 5/64
[52] U.S. Cl. ..................................... 358/254; 358/89; 358/252; 350/276 R
[58] Field of Search ................ 358/89, 254, 255, 252, 358/248; 350/14 K, 276 SL, 276 R; 313/478

[56] References Cited

U.S. PATENT DOCUMENTS

| | | | |
|---|---|---|---|
| 2,779,938 | 1/1957 | Pifer | 358/252 |
| 3,226,867 | 1/1966 | Newton, Jr. | 350/144 |
| 3,701,581 | 10/1972 | Henkes, Jr. | 350/144 |

Primary Examiner—Howard W. Britton
Assistant Examiner—John K. Peng
Attorney, Agent, or Firm—Roger M. Rickert

[57] ABSTRACT

A method and apparatus is disclosed for displaying a single flat two dimensional picture in a lighted room where the area surrounding the picture has its stereoscopic cues suppressed to minimize the observer's two-eyed stereoscopic judgement of the location of the plane of the picture, whereby a binocular two-eyed observer can sense the inherent psychological depth indicators in the picture, and see the psyhically flat two dimensional picture as a three dimensional scene, much like a one-eyed observer sees it.

10 Claims, 3 Drawing Figures

DEPTH PERCEPTION BY IMAGE ISOLATION

BACKGROUND OF THE INVENTION

Field of the Invention

This invention relates to visual depth perception in two dimensional pictures, and displays, including electronic generated ones.

There are two methods to perceive depth both in real life scenes and in pictures, a stereoscopic perception of depth and a psychological perception of depth. Stereoscopic depth perception requires the observer to use two eyes whereas psychological depth perception can be experienced by the use of just one eye.

Stereoscopic depth perception requires that the observer view a real life scene from two different locations at the same time. That is he sees a real life scene from the location of his right eye and at the same time sees a similar real life scene from the more left location with his left eye. In real life this occurs naturally. When pictures are substituted for real life, it requires the use of two pictures taken respectively from these different right eye and left eye locations. Furthermore, to see stereoscopic depth perception in these two pictures requires the use of a stereoscope or other system to control which eye sees which picture only.

Psychological depth perception on the other hand can employ the use of only one eye while looking at the real life world. A one-eyed observer perceives depth by the psychological depth perception cues normally present in most real life scenes.

When pictures are substituted for real life, the one-eyed observer simply looks at a single picture and sees depth in the picture by the same psychological depth perception cues.

Following is a list of the most common psychological depth perception cues:

1. Areal perspective, the change of color or softening of the shapes (sometimes called "graying") gives a feeling of distance to far objects.
2. Distribution of light and shade upon an object gives information as to its solidity and shape as, for example, the highlights and shadows of a sphere which make it appear round.
3. Overlapping of contours, as when a near object hides part of a more distant object thereby providing information of their relative distances.
4. Geometrical perspective is an indicator of distance as, for example, the parallel rails of a railroad track appear to converge as they extend in the distance.
5. Depth is sensed by the interpretation of size, because a near object appears larger than a similar object farther away.

All of these psychological depth perception cues are very effective for a one-eyed observer, or a two-eyed observer employing only one eye. However, when two eyes are employed, the binocular stereoscopic depth perception sense of the observer comes into play and, because it is very strong, it tends to override most, if not all, of the aforementioned inherent psychological depth indicators whereby the picture appears to be the flat picture it actually is. That is to say the scene appears to be a flat picture on a flat plane or two dimensional surface.

These psychological depth perception cues are listed on pages 1071 to 1074 of the "Text-Book of Opthalmology", 1946, by Duke-Elder, Volume I. Here also the author makes reference to the fact that Francis Bacon (Englishman who lived 1561 to 1626) pointed out that, ". . . pictures look more realistic when regarded with one eye so that the lack of the stereoscopic effect is not felt psychologically". Bacon's observation is still accepted today.

A better understanding of these principles can be had if the reader takes time at this point to actually experience the difference between one-eyed and two-eyed viewing of flat two dimensional photographs. Looking at several different photographs (not drawings or paintings) on a wall sized calendar, while alternately covering one eye, then uncovering it to use two eyes, will forcefully demonstrate the concept. Upon covering one eye for a few seconds, the observer will gradually see depth in the calendar photograph that he never saw before with two eyes.

Recently while working in a lighted room with images projected onto a focusing concave mirror screen, previously unnoticed visual pehnomena were discovered which later led to this invention. See my U.S. Pat. No. 4,322,747, granted Mar. 30, 1982, and my pending patent application, Ser. No. 478,533, filed Mar. 24, 1983.

SUMMARY OF THE INVENTION

It was found when viewing a picture in an illuminated room that the picture elements, that is the spots of light, dark, and color, which constitute the picture itself, do not by themselves greatly influence the stereoscopic judgement of a two-eyed observer as to the flatness and actual plane of the picture. Instead, it was found that the stereoscopic cues in the structure adjacent to the scene or picture exert a much greater influence on the observer's stereoscopic judgement of the plane and the flatness of the picture.

The conventional structure adjacent to the picture not only establishes the plane of this adjacent structure but as it joins the edge and plane of the picture, it also draws attention to and emphasizes the plane and flatness of the picture it surrounds.

It was subsequently found that if the picture was made to optically appear to hang in space, unattached to anything adjacent to it, the psychological depth perception cues became strongly evident to a binocular two-eyed observer and the two dimensional picture became a three dimensional scene.

A prime object of this invention is to provide a two dimensional picture with a surrounding area which is essentially invisible to an observer while he is watching the picture in a lighted room, so that the observer can better sense the psychological depth perception cues in the picture and see the picture not as a flat picture, but as a three dimensional real life scene.

A further object of the invention is to provide a means to suppress, hide, or camouflage the plane of a picture by suppressing the stereoscopic cues in the area surrounding the picture, including terminating the outer periphery of that surrounding area in a plane other than that of the picture whereby the psychological depth perception cues in the picture provide a two-eyed observer with a greater sense of depth in the scene of the picture.

A salient object of the invention is to provide a bezel or surround for a picture which has angled surfaces which reflect light from a first surface to a second surface and thus absorb the light to a level below the visual threshold and render the bezel invisible to the observer.

BRIEF DESCRIPTION OF THE DRAWINGS

These and other objects, features, and advantages of the present invention will become apparent from the following description and accompanying drawings in which.

DESCRIPTION OF THE PREFERRED EMBODIMENT

Figure 1:
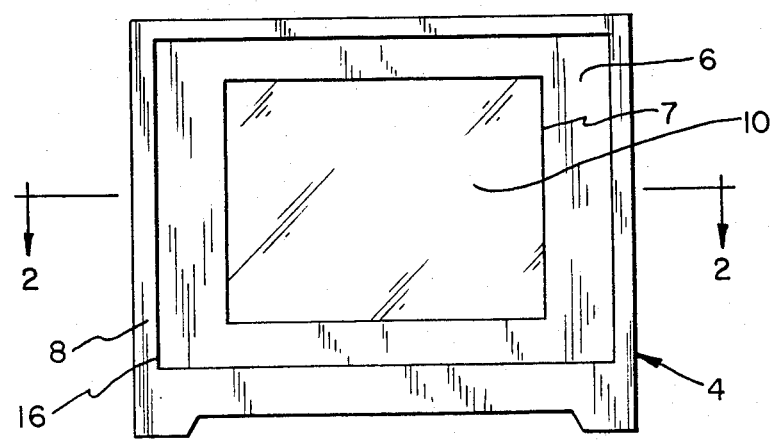
FIG. 1 is a front or observer's view of one form of the invention.

Consider first FIG. 1 which illustrates a preferred means to isolate the picture. A television tube has its picture 10 surrounded by an essentially invisible bezel. Surface 6 of the bezel extends outward in all directions from the picture border 7 to join (by way of surface 12, FIG. 2) the cabinet front 8 at 16. The dark surface 6 is surrounded by a cabinet 4 having a front portion 8.

Figure 2:
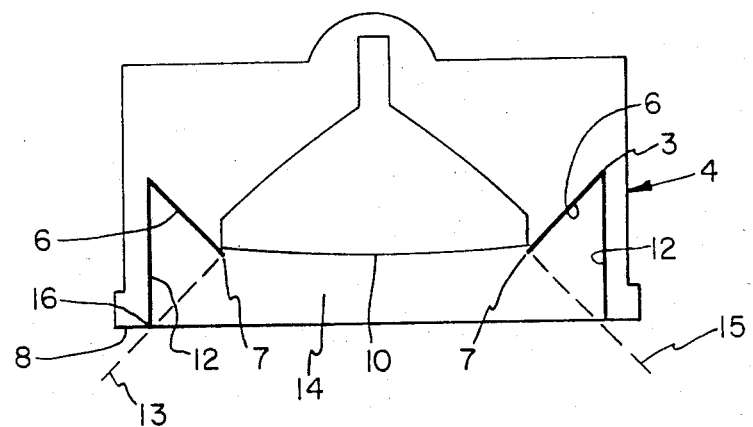
FIG. 2 is a cross or midsection top view along lines 2—2 of the structure shown in FIG. 1.

FIG. 2 is a top cross-section view of FIG. 1 at 2—2. The cabinet front portion 8 joins surface 12 of the bezel at 16. Surfaces 6 and 12 join rearward of the picture 10 at 3 to provide the exposed but invisible bezel body. Dotted lines 13, 15 encompass the area of the viewing audience. The angle encompassed by dotted lines 13, 15, representing the viewing area, can be widely varied as desired provided the angles of the surfaces of the bezel are in proper relationship to the angle subtended by lines 13, 15. Viewed from within this angle, the surfaces 6, 12 properly coated will appear invisible to an observer, even in a lighted room.

In the preferred form, surfaces 6, 12 are black. Any light coming from the bezel surfaces within the angle subtended by dotted lines 13, 15 because of the angles of surfaces 6, 12 must first be reflected at least twice between surfaces 6, 12 and will be below the visible threshold of the observer and hence invisible to him. The low visibility of the bezel surfaces is achieved by proper surface preparation, including coating them with a gloss or near gloss surfaced black paint. Light striking such a surface is reflected from that surface by as little as 0.03 or 3% of the original striking light. Light penetrating the surface of the paint is essentially absorbed by the paint pigment. Because of the angle relationship of surfaces 6, 12 the reflected 3% light is directed to the adjacent second surface where it is again reflected as little as 0.03 or 3% of the reflected 3% light. Thus the second reflection intensity becomes as little as $0.03 \times 0.03$ or 0.0009 of the original light. This is then 0.09% or less than 1/1000 of the original intensity of the light in the room falling on the bezel. This can render the bezel essentially invisible to an observer.

The preceeding description of the path the room light from the bezel must take to reach an observer within the angle subtended by dotted lines 13, 15, FIG. 2 was the case where only two surface reflections were addressed. A very high percentage of the room light falling on the bezel will be reflected between surfaces 6, 12 three, four or even more times.

These additional reflections further reduce the brightness of the light from the bezel to the observer. In the case of only three reflections, the 3% reflection per surface becomes $0.03 \times 0.03 \times 0.03$ or only a 0.000027 portion of the original room light falling on the bezel. Such brightness is far below an observer's visual threshold while watching a video tube in a normally lighted room.

In the preferred form, the viewing area angle is set at 45° on either side of a perpendicular line from the picture surface. In the form shown in FIG. 2, the surface 12 is essentially parallel to the above perpendicular line and surface 6 is positioned at 45° from surface 12. Of course the narrower the angle is between surfaces 6, 12, the wider the viewing area can be.

The forward extension of surface 12 at 16 is sufficient to restrict the light falling on surface 6 to an angle to surface 6 such that it will reflect that light on into the cavity formed by surfaces 6, 12 instead of out to an observer. A wider observers angle requires a cavity with surfaces 6, 12 positioned less than 45° from each other. However, the 45° viewing area of the preferred form seems a practical area for most uses.

In the preferred form shown in FIG. 2, surfaces 12 extend forward beyond the forward edge 7 of the surfaces 6 to the cabinet area 8 at 16. In FIG. 2, the sides of the bezel 12 are shown in cross-section, as is the angled surface 6 of the bezel cavity. The area above the picture 10 has a similar cavity formed by surfaces similar to 6 and 12. The bottom surface similar to 12 can be substituted by a vacancy 14 where no surface is present, however, a solid surface similar to 12 is preferred. The side surfaces 12 and top surface similar to 12 which extend forward of the picture 10 surface, can act as a hood-like shade to prevent excessive room light reflections from the picture 10 surface. This forward extension of the outer periphery of the bezel being at a different plane than the picture 10 surface further aids in obscuring the plane of the picture 10 surface.

Figure 3:
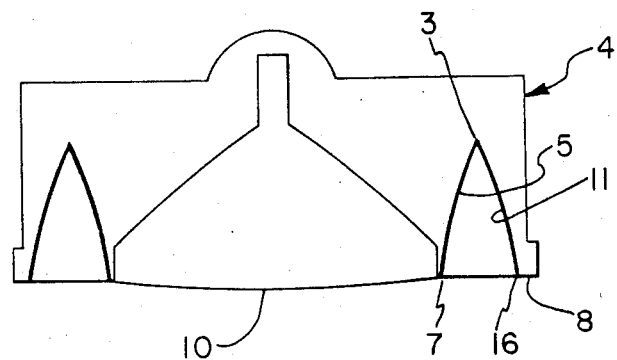
FIG. 3 is a cross or midsection top view similar to the view along lines 2—2 of the structure of FIG. 1, but in a modified form of the invention shown in FIG. 2.

Other modifications which are still part of this invention include curving at least part of either or both flat surfaces 6, 12 of FIG. 2. One form of the invention employing curved surfaces is shown in FIG. 3. In this modification the cabinet 4 houses a video tube having a display 10 surrounded by an essentially invisible bezel. Here the bezel surfaces 5, 11 are curved and replace the surfaces 6, 12 of FIG. 2. These surfaces can be modified as desired including being flat or partially flat instead of all curved and can angle from edge 7 and 16 rearward to meet at 3. In FIG. 3 the front 8 of the cabinet is shown to be more nearly on the plane of the display 10, but by extending or restricting the surface 11, the front 8 could be either rearward or forward of the display 10.

The V-shaped junction 3 of surfaces 6, 12 of FIG. 2 and junction 3 of surfaces 5, 11 of FIG. 3 can instead be a smooth flat or curved junction without the V-shape as shown. The V-shape is preferred however. Furthermore, the bezel structure of FIGS. 2 and 3 can be combined or modified as desired, to render the bezel invisible by reflecting a large portion of the room light at least twice before entering the observer's viewing area. Other modifications can include surfaces 6, 12, 5 and 11 being made of several separate surfaces in association instead of solid surfaces. Furthermore, the front portion 8 of the cabinet 4 in FIGS. 1, 2 and 3 can be a width similar to that shown in the Figures or the front 8 can be wider or narrower than shown, including being a joint between surfaces 11, 12 and the cabinet 4 side as narrow as a knife edge or corner. Also, one or more angles radii or spaces may be used as desired.

There has been here described a unique surround or bezel for a picture or display which can appear essentially invisible to an observer who is located within the viewing area angle before the display 10. The invention includes the unique feature of being concave in shape with sides angled so any light coming from the bezel into the viewing area angle of the display 10 must first be reflected at least twice before leaving the bezel to enter the viewing area. This level of light which is below the visible threshold of the observer can be achieved by several surface color and reflection treatments of bezel surfaces, including providing a gloss black color finish to surfaces 6 of FIG. 1, 6, 12 of FIG. 2, and surfaces 5, 11 of FIG. 3. A semi-gloss or flat, low reflecting surface, however, may be used under certain conditions. In FIG. 3, the cabinet 4 front 8 is located in the general plane of the display 10. However, in the preferred form of the invention the cabinet 4 front 8 is placed at a different plane than the display 10 as shown in FIG. 2, for the maximum effect under a wider variety of lighting conditions. Conventional black painted television tube bezels do not adequately camouflage the plane of the picture to allow a two-eyed observer proper use of the psychological depth perception cues. First, light from the television picture reflects from the bezel to the observer because of the bezel surface angle and because the bezel is forward of the picture and reflects picture light to the observer. Second, room light falling on the bezel also is directed to the observer because of the bezel surface angle. Any visibility of the bezel establishes not only the plane of the bezel but also the plane of the adjacent picture. Under these conditions much if not all of the three dimensional effect in the picture is lost. The present invention could be described as a reverse bezel. In this invention the bezel surface 6 angles from the picture 10 border 7 outward and rearward in a direction away from the observer to where it joins surface 12 at 3. It then angles toward the observer as surface 12 and it does so at an angle that does not reflect picture 10 light or room light into the observer's area. In the preferred form surface 6 angles rearward at about 45° to the general plane of the picture 10. Where surface 6 joins surface 12 at 3, the bezel forms a V-shape. Surface 12 angles toward the observer in a plane perpendicular to the general plane of the picture 10 surface. Although surface 12 extends closer to the observer than the picture 10, the angle of surface 12 is such as to reflect picture light falling on it to an area other than the observer's area. The opposing surfaces 6, 12 and 11, 5 forming the concave bezel are described as joining at 3. In a modified form of the invention, the surfaces 6, 12 (FIG. 2) and 11, 5 (FIG. 3) can be separated and instead overlap or otherwise be arranged to achieve the here disclosed effect.

Under certain conditions some depth perception effect can be had by providing the here described invisible arrangement at the lateral edges of the picture only, and providing a more conventional arrangement about and below the picture. A better effect, however, is achieved by surrounding more of the picture with the here described invisible bezel.

This invention to provide depth perception and realism from a single flat picture is so effective and so pleasant to watch, that it has been found far superior to true stereoscopic three dimensional pictures made from stereoscopic pairs of pictures. This system is free of the eye strain and minaturization effects generally present in the older two picture stereoscopic system. Both greater realism and greater comfort have been achieved.

The realism is frequently so great that observers sometimes lean to one side to try to see around the picture border believing the picture border is a window and that a better view of the three dimensional world beyond the window can be had if they lean to one side. Furthermore, this system provides for pictures or displays, a greater realism and a depth perception without the otherwise required two images and without any changes in the present television transmission system.

Once the principles of the invention are understood, many changes, variations, and modifications of the disclosed embodiments of the invention may be made, including employing other optical means, other electronic means, other visual means, and other mechanical means to suppress the unwanted stereoptically sensed cues associated with two-eyed observation, without departing from the invention concept. Furthermore, the principles of the invention may be applied to other electronic generated images present or yet to be developed. Such use becomes part of this invention. It is therefore not intended to limit the invention otherwise than as required by the appended claims.

What is claimed is:

1. For use in conjunction with a picture source to be displayed to viewers within a predetermined angular viewing area, a picture source border substantially surrounding at least the laterally opposite sides of the picture source and having a concave portion opening outwardly toward the viewing area with the surface portions thereof relatively positioned so that any light entering the region of the concave portion which is incident to and reflected from a surface thereof must also be incident to and reflected from another surface of the concave portion prior to exiting the region into the viewing area.

2. The picture source border of claim 1 wherein the concave portion extends from the picture source laterally outwardly a predetermined distance to create a band surrounding the picture source in which stereoscopic cues are suppressed to thereby enhance the three dimensional effect on an observer of inherent depth cues within a displayed picture.

3. The picture source border of claim 1 wherein at least some intermediate surface area of the concave portion is displaced rearwardly of the picture source away from the viewing area.

4. The picture source border of claim 3 including a forwardly extending hood-like shade protruding beyond the picture source toward the viewing area for reducing reflections of ambient light from the picture source surface into the viewing area.

5. The picture source border of claim 1 wherein the reflection coefficient of the concave portion is sufficiently low that light entering the region of the concave portion and subjected therein to at least two reflections has its intensity reduced below a visible threshold to an observer.

6. The picture source border of claim 1 wherein substantially the entire picture source periphery is surrounded by the border.

7. The picture source border of claim 6 wherein the concave portion extends from the picture source laterally outwardly a predetermined distance to create a band surrounding the picture source in which stereoscopic cues are suppressed to thereby enhance the three dimensional effect on an observer of inherent depth cues within a displayed picture.

8. The picture source border of claim 6 wherein at least some intermediate surface area of the concave portion is displaced rearwardly of the picture source away from the viewing area.

9. The picture source border of claim 6 including a forwardly extending hood-like shade protruding beyond the picture source toward the viewing area for reducing reflections of ambient light from the picture source surface into the viewing area.

10. The picture source border of claim 6 wherein the reflection coefficient of the concave portion is sufficiently low that light entering the region of the concave portion and subjected therein to at least two reflections has its intensity reduced below a visible threshold to an observer.

* * * * *